(12) United States Patent
Mankovitz

(10) Patent No.: US 6,253,069 B1
(45) Date of Patent: Jun. 26, 2001

(54) METHODS AND APPARATUS FOR PROVIDING INFORMATION IN RESPONSE TO TELEPHONIC REQUESTS

(76) Inventor: Roy J. Mankovitz, 24236 Park Granada, Calabasas, CA (US) 91302

(*) Notice: Subject to any disclaimer, the term of this patent is extended or adjusted under 35 U.S.C. 154(b) by 0 days.

(21) Appl. No.: 09/290,021

(22) Filed: Apr. 9, 1999

Related U.S. Application Data

(63) Continuation-in-part of application No. 08/849,354, filed on May 22, 1997, now Pat. No. 5,949,492, which is a continuation-in-part of application No. 08/486,769, filed on Jun. 7, 1995, now Pat. No. 5,703,795, which is a continuation-in-part of application No. 08/344,333, filed on Nov. 22, 1994, which is a continuation-in-part of application No. 08/322,824, filed on Oct. 13, 1994, now abandoned, which is a continuation-in-part of application No. 08/227,079, filed on Apr. 13, 1994, now abandoned, which is a continuation-in-part of application No. 07/901,735, filed on Jun. 22, 1992, now abandoned.

(60) Provisional application No. 60/095,739, filed on Aug. 7, 1998, provisional application No. 60/083,616, filed on Apr. 30, 1998, and provisional application No. 60/083,058, filed on Apr. 24, 1998.

(51) Int. Cl.$^7$ ............................. H04M 1/64; G06F 19/02; G08C 17/00

(52) U.S. Cl. ..................... 455/186.1; 379/31; 379/201; 379/93.12

(58) Field of Search ........................... 379/31, 201, 142, 379/114, 115, 93.12, 93.17, 101.01; 370/50; 364/410; 455/186.1, 2; 348/12, 2; 435/186.1

(56) References Cited

U.S. PATENT DOCUMENTS

| | | |
|---|---|---|
| Re. 17,023 | 7/1928 | Clement . |
| 3,764,747 | 10/1973 | Nakajima et al. ................... 179/7 R |
| 3,911,446 | 10/1975 | Albertini ............................ 346/33 R |
| 4,337,463 | 6/1982 | Vangen ............................... 340/825.3 |
| 4,361,851 | 11/1982 | Asip et al. ............................. 358/84 |
| 4,528,643 | 7/1985 | Freeny, Jr. ............................ 364/900 |
| 4,592,546 | 6/1986 | Fascenda et al. ..................... 273/1 E |
| 4,622,583 | 11/1986 | Watanabe et al. ..................... 358/84 |

(List continued on next page.)

FOREIGN PATENT DOCUMENTS

| | | |
|---|---|---|
| 2630536 | 10/1989 | (FR) . |
| WO 91/11602 | 7/1991 | (WO) . |

*Primary Examiner*—Daniel Hunter
*Assistant Examiner*—Alan T. Gantt
(74) *Attorney, Agent, or Firm*—Gifford, Krass, Groh, Sprinkle, Anderson & Citkowski, PC

(57) ABSTRACT

Methods and apparatus provide a reply to a telephone caller in response to an abbreviated input string. A message is received from a telephone caller during a telephone call, and supplemental information is derived which relates to at least one of the telephone caller and the telephone call. Using the message from the caller in combination with the supplemental information, an appropriate reply to the message is identified, which is then provided to the caller. The invention is applicable to various telecommunications infrastructures, including cellular telephony. The message may be provided by the caller in response to a request forming part of a radio or television broadcast, in which case the message might relate to channel number or broadcast frequency, with the system storing a channel map to identify the station responsible for the broadcast, if so required. The supplemental information relating to the caller would typically include at least a portion of the telephone number of the caller, or may additionally relate to the date or the time of the telephone call. Depending upon the circumstances, the date/time of the call may form part of the message. The reply to the caller may occur during the telephone call, wherein the system might place an additional telephone call to identify the appropriate reply. Such a call may be toll-free, in which case the user may be patched-in to receive the information. Alternatively the reply may be in the form of a facsimile or electronic mail later directed to the caller.

41 Claims, 3 Drawing Sheets

U.S. PATENT DOCUMENTS

| | | | |
|---|---|---|---|
| 4,630,143 | 12/1986 | Juso et al. | 360/72.2 |
| 4,695,869 | 9/1987 | Weinblatt | 358/84 |
| 4,718,106 | 1/1988 | Weinblatt | 455/2 |
| 4,788,682 * | 11/1988 | Vij et al. | 370/110.1 |
| 4,847,886 | 7/1989 | Chumley | 379/56 |
| 4,864,604 | 9/1989 | Aihara | 3798/110 |
| 4,870,515 | 9/1989 | Stokes | 360/72.2 |
| 4,887,308 | 12/1989 | Dutton | 455/156 |
| 4,920,432 | 4/1990 | Eggers et al. | 360/33.1 |
| 4,943,963 | 7/1990 | Waechter et al. | 370/94.1 |
| 4,953,039 | 8/1990 | Ploch | 360/32 |
| 4,956,768 | 9/1990 | Sidi et al. | 364/200 |
| 4,977,455 | 12/1990 | Young | 358/142 |
| 4,989,234 | 1/1991 | Schakowsky et al. | 379/92 |
| 5,013,038 | 5/1991 | Luxenberg et al. | 279/439 |
| 5,036,500 | 7/1991 | Ganter | 368/47 |
| 5,054,360 | 10/1991 | Lisle et al. | 84/645 |
| 5,063,610 | 11/1991 | Alwadish | 455/45 |
| 5,073,931 | 12/1991 | Audebert et al. | 380/23 |
| 5,081,680 | 1/1992 | Bennett | 380/50 |
| 5,083,800 | 1/1992 | Lockton | 273/439 |
| 5,119,507 | 6/1992 | Mankovitz | 455/154.1 |
| 5,119,711 | 6/1992 | Bell et al. | 84/622 |
| 5,120,076 | 6/1992 | Luxenberg et al. | 273/439 |
| 5,132,992 | 7/1992 | Yurt et al. | 375/122 |
| 5,136,644 | 8/1992 | Audebert et al. | 380/25 |
| 5,155,762 | 10/1992 | Croquet et al. | 379/92 |
| 5,162,905 | 11/1992 | Itoh et al. | 358/84 |
| 5,185,786 * | 2/1993 | Zwick | 379/201 |
| 5,189,630 | 2/1993 | Barstow et al. | 364/514 |
| 5,191,573 | 3/1993 | Hair | 369/84 |
| 5,195,134 | 3/1993 | Inoue | 380/20 |
| 5,214,792 | 5/1993 | Alwadish | 455/45 |
| 5,216,703 | 6/1993 | Roy | 379/59 |
| 5,237,157 | 8/1993 | Kaplan | 235/375 |
| 5,262,940 | 11/1993 | Sussman | 364/403 |
| 5,262,964 | 11/1993 | Bonsall et al. | 364/514 |
| 5,303,393 | 4/1994 | Noreen et al. | 455/3.2 |
| 5,313,408 | 5/1994 | Goto | 364/514 |
| 5,355,302 | 10/1994 | Martin | 364/410 |
| 5,357,505 | 10/1994 | Tsumura et al. | 370/60 |
| 5,418,844 | 5/1995 | Morrisey et al. | 379/207 |
| 5,444,499 | 8/1995 | Saitoh | 348/734 |
| 5,448,625 * | 9/1995 | Lederman | 379/67 |
| 5,455,823 | 10/1995 | Noreen et al. | 370/50 |
| 5,457,739 | 10/1995 | Le Cheviller | 379/93 |
| 5,469,431 * | 11/1995 | Wendorf et al. | 370/50 |
| 5,539,635 * | 7/1996 | Larson, Jr. | 364/479.04 |
| 5,559,878 * | 9/1996 | Keys et al. | 379/265 |
| 5,570,295 | 10/1996 | Isenberg et al. | 364/514 R |
| 5,572,442 | 11/1996 | Schulhof et al. | 364/514 C |
| 5,592,511 | 1/1997 | Schoen | 375/220 |
| 5,629,867 | 5/1997 | Goldman | 364/514 R |
| 5,661,787 * | 8/1997 | Pocock | 379/101.01 |
| 5,675,734 | 10/1997 | Hair | 395/200.01 |
| 5,689,081 | 11/1997 | Tsurumi | 84/609 |
| 5,689,245 | 11/1997 | Noreen et al. | 340/825.49 |
| 5,703,795 | 12/1997 | Mankovitz | 364/514 R |
| 5,721,584 | 2/1998 | Yoshinobu et al. | 348/13 |
| 5,734,119 | 3/1998 | France | 84/622 |
| 5,752,186 | 5/1998 | Malackowski et al. | 455/414 |
| 5,758,286 | 5/1998 | Leppanen | 455/455 |
| 5,759,101 * | 6/1998 | Von Kohorn | 463/40 |
| 5,774,534 | 6/1998 | Mayer | 379/142 |
| 5,809,246 | 9/1998 | Goldman | 395/200.47 |
| 5,815,814 * | 9/1998 | Dennison et al. | 455/456 |
| 5,835,583 | 11/1998 | Hetz et al. | 379/220 |
| 5,857,149 | 1/1999 | Suzuki | 455/186.1 |
| 5,864,804 * | 1/1999 | Kalveram | 704/233 |
| 5,867,155 * | 2/1999 | Williams | 345/327 |
| 5,867,780 | 2/1999 | Malackowski et al. | 455/414 |
| 5,870,710 | 2/1999 | Ozawa | 704/500 |
| 5,880,386 | 3/1999 | Wachi et al. | 84/601 |
| 5,886,274 | 3/1999 | Jungleib | 84/601 |
| 5,892,171 | 4/1999 | Ide | 84/622 |
| 5,900,564 | 5/1999 | Kurakake | 84/477 R |
| 5,907,322 | 5/1999 | Kelly | 345/327 |
| 5,907,793 | 5/1999 | Reams | 455/3.1 |
| 5,913,258 | 6/1999 | Tamura | 84/604 |
| 5,963,916 | 10/1999 | Kaplan | 705/26 |
| 5,991,737 | 11/1999 | Chen | 705/26 |

* cited by examiner

METHODS AND APPARATUS FOR
PROVIDING INFORMATION IN RESPONSE
TO TELEPHONIC REQUESTS

REFERENCE TO RELATED APPLICATIONS

This application claims priority of U.S. provisional patent application Ser. Nos. 60/083,058, filed Apr. 24, 1998; 60/083,616, filed Apr. 30, 1998; and 60/095,739, filed Aug. 7, 1998, and is a continuation-in-part of U.S. application Ser. No. 08/849,354, filed May 22, 1997, now U.S. Pat. No. 5,949,492, which is a continuation-in-part of U.S. application Ser. No. 08/486,769, filed Jun. 7, 1995, now U.S. Pat. No. 5,703,795, which is a continuation-in-part of U.S. application Ser. No. 08/344,333, filed Nov. 22, 1994, which is a continuation-in-part of U.S. application Ser. No. 08/322,824, filed Oct. 13, 1994, now abandoned, which is a continuation-in-part of U.S. application Ser. No. 08/227,079, filed Apr. 13, 1994, now abandoned, which is a continuation-in-part of U.S. application Ser. No. 07/901,735, filed Jun. 22, 1992, now abandoned, the contents of all of the above being incorporated herein by reference in their entirety.

FIELD OF THE INVENTION

This invention relates generally to information distribution and, more particularly, to apparatus and methods for providing desired information to users of telecommunications devices such as cellular telephones.

BACKGROUND OF THE INVENTION

With the wide proliferation of cordless and cellular telephones, it is increasingly common to have a phone in close proximity while listening to the radio in a car or watching television at home. There are currently over 66 million cellular telephone users in the United States, and this number is increasing rapidly. Cell phone users carry these devices wherever they go, particularly since newer services cover much a broader area, including the entire country in a growing number of situations.

It would be advantageous, if not profitable, for advertisers and other information providers to interact with telephone users, particularly if it the interaction results in the sale of products or services in a given area. Ironically, even with the growing number of portable phones, it is difficult for consumers to respond to offers or receive more information from advertisers. One source of the difficulty is the large number of digits that must entered to contact the advertiser and identify the type of information desired.

Radio advertisers, in particular, now reach a greater number of individuals in close proximity to a telephone due to the widespread use of mobile phones. Nevertheless, if the driver or passenger in an automobile must dial a seven-digit number followed by several other pushbutton entries to obtain certain information, many will either forget the number to call or lose interest. Even with automated voice-prompted menu selections, the caller might need to remain on the line longer than they wish to.

U.S. Pat. No. 5,703,795, which is incorporated herein by reference, discloses the derivation of station (S), date (D), time (T) and response (#) data to correlate a user's response to a particular piece of broadcast information (SDT). In each case, however, specified hardware is required for storing SDT# at a receiver site, and for communicating the data via the Internet or a point-of-sale (POS) system to a central location, where it is compared to broadcast station logs to convey an appropriate reply to the user. If an SDT-type protocol could take advantage of existing telecommunications devices, the resulting system might be more easily implemented since even fewer changes would be required to the existing infrastructure.

SUMMARY OF THE INVENTION

The subject invention resides in methods and apparatus for providing a reply to a telephone caller, including inputs from the telephone caller which are in an abbreviated form. According to a method aspect of the invention, a message is received from a telephone caller during a telephone call, and supplemental information is derived which relates to at least one of the telephone caller and the telephone call. Using the message from the caller in combination with the supplemental information, an appropriate reply to the message is identified, which is then provided to the caller. The invention is applicable to various telecommunications infrastructures, including cellular telephony.

In a preferred embodiment, the message is a numerical or alphanumerical code entered by the caller using the telephone. The message may be provided by the caller, for example, in response to a request forming part of a radio or television broadcast. In such a case, the message might relate to channel number or broadcast frequency, with the system storing a channel map to identify the station responsible for the broadcast, if so required. The supplemental information relating to the caller would typically include at least a portion of the telephone number of the caller, or may additionally relate to the date or the time of the telephone call. Depending upon the circumstances, the date/time of the call may form part of the message.

The reply to the caller may occur during the telephone call, wherein the system might place an additional telephone call to identify the appropriate reply. Such a call may be toll-free, in which case the user may be patched-in to receive the information. Alternatively, the reply may be in the form of a subsequent telephone call, a facsimile, or electronic mail later directed to the caller. As one example of many, digital music may be downloaded to a particular e-mail address as a reply to a telephonic request, with royalties or other charges being allocated in accordance with pre-programmed criteria. In the case of an advertisement, the advertiser will additionally pay for the telephone charges, whereas, if the information itself has value, as with a copyrighted song or other information, the caller will typically be billed or debited, as appropriate.

Depending upon the physical implementation, voice recognition apparatus may be used to interpret a message from the caller, and speech synthesis may be used to provide the reply. The invention is not limited to radio/TV broadcasts, in that the user may be responding to an outdoor advertisement such as a billboard. In such an embodiment, a global positioning satellite system is preferably employed to derive the location of the caller to provide an appropriate reply in response to an incoming call. Other aspects of the invention are disclosed, including apparatus to carry out the various methods.

DETAILED DESCRIPTION OF THE INVENTION

Figure 1:
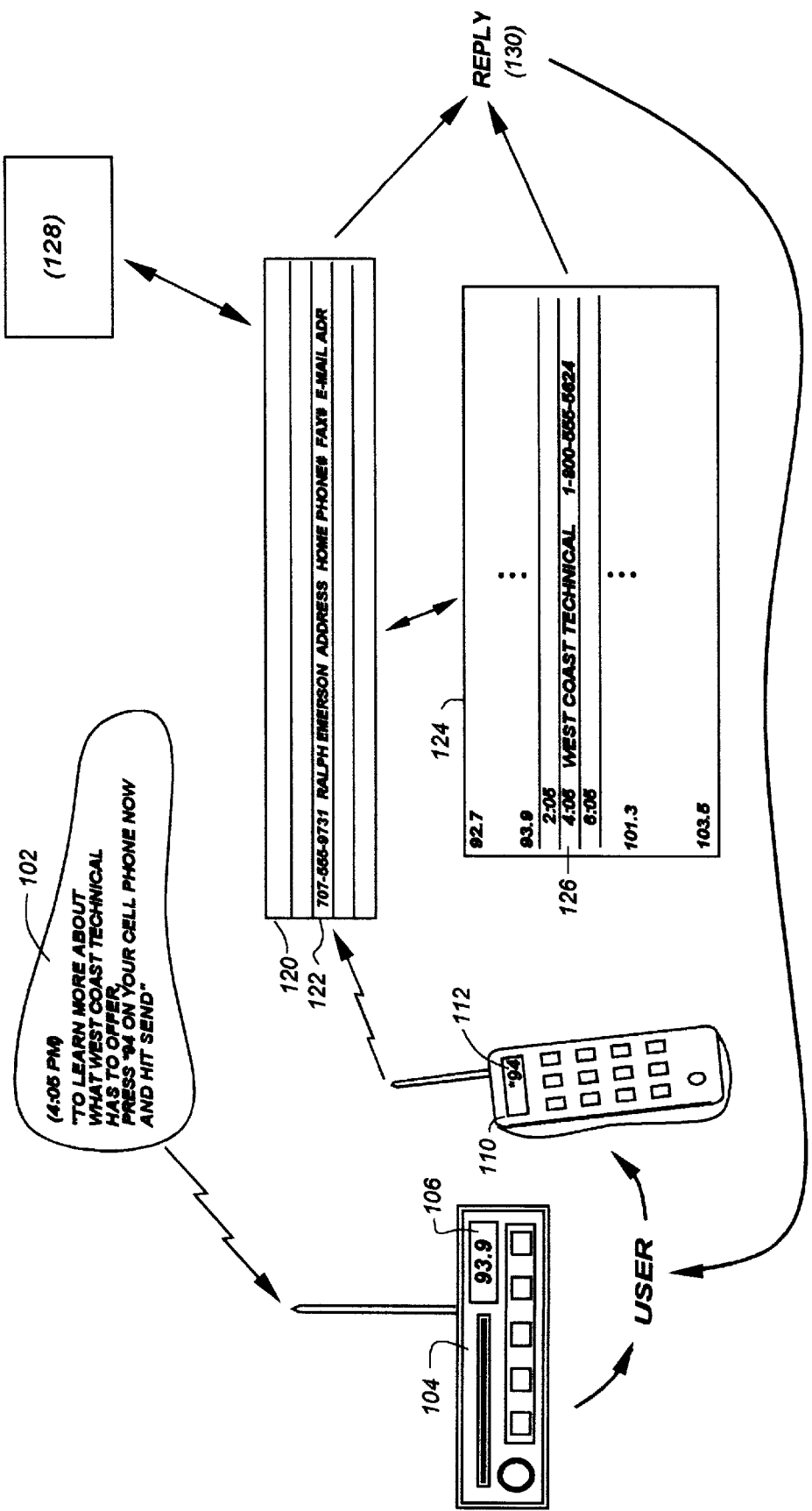
FIG. 1 illustrates a radio/cell phone environment according to the invention.

This invention improves upon the "PassKey" system disclosed in U.S. Pat. No. 5,703,795, by applying the derivation of station, date, time and response (SDT#) to users of standard, unmodified telephones and related equipment. Although the examples presented focus on the use of cellular telephones, the invention is applicable to other type of telecommunications devices such as personal digital assistants with cellular modems, as well as cordless and wired phones, depending upon the particular embodiment. Note also that references to the "telephone company" should be interpreted to include the existing and future-implemented public telephone network, as well as private telephone answering services, including those equipped to use the PassKey system as described previously or herein.

Broadly, according to the invention, when a telephone call is placed, existing telephone company technology is used where possible to derive supplemental information associated with the identity of the caller and nature of the interaction. Such supplemental information would ordinarily include one or more of the following:

the caller's originating phone number, the caller's area or location (cellular zone for mobile phones or prefix area for fixed phones), and the date and time of the call.

The amount of supplemental information required to uniquely identify a caller and satisfy a particular request will increase with potential congestion due to the frequency of different callers responding to overlapping stimuli. For example, if the geographic area of the caller is inconsequential, the date and time of the call may be the only supplemental information in need of derivation. Alternatively, if advertisements are sufficiently spaced apart in time, the date may be sufficient without the exact time. In the general case, however, with potential responses being closely spaced in terms of frequency and geography, supplemental information relating to station, date, and time may be required along with additional information relating to the phone user to uniquely identify a particular broadcast, program offer, or other potential transaction.

Suppose, for instance, that for a given calling area, each broadcast station is assigned a unique station number (from 10–99, for example). For a car radio/cell phone embodiment of the invention, assume also that for a station identified as 23 in Los Angeles, the announcer says: "To respond to this ad, enter star 23 on your cell phone and press SEND now." (Note that # or some other key could be used instead of the * key.)

When the call is received at the cell-phone company, the user's phone number, location, date and time of call, and the number 23 are recorded. In this example, the announcer could also request that the user indicate a response to a question as part of a contest, quiz, poll, and so on. If a multiple-choice question with three possible answers was announced, and the user's guess was 2, the user would key in *232. Once the call is received and the data logged in at the phone company, a beep tone would preferably be transmitted back to the user, indicating that the entry has been acknowledged to the user can terminate the call.

As an alternate to the entry of an announced code, the station may be identified by broadcast frequency radio stations or the channel number for television and cable broadcasts. Or the station call letters could be entered using the telephone keypad in the same way that names are now spelled for automated company directories. Thus, in the case of a car radio, the user could simply look at the radio display of frequency, and simply key it in, preceded by an appropriate character such as the * key. Note that since FM stations in the U.S. are at odd frequencies and AM stations are at even frequencies, the system can differentiate between AM and FM stations just by analyzing the frequency. As examples, *1051 would be interpreted to mean FM station at 105.1 MHZ FM, whereas *1070 would mean 1070 KHz AM.

For cable system users it might be convenient to store, at a central location accessible by the phone company, the channel maps for the various cable companies, so that the actual station can be determined from its channel number in that cable system. A table would also preferably be stored identifying the various cable companies in each telephone system zone. In situations where there are multiple cable/DSS/microwave TV providers in a particular zone, the user may be required to call the phone company in advance and register his cable company with his phone number to take full advantage of the invention. Such registration would preferably be carried out in an automated, voice-actuated manner.

In a comprehensive embodiment of the invention, the phone company will be able to record SDT# as well as user ID in response to an incoming call. In the case of a broadcast ad, "T" may be delayed from the time of the broadcast due to delays in the phone system or delays by the caller in responding to the ad. This may not be a problem with emerging cellular phone, since newer digital units include a clock/calendar function to display date/time. It is envisioned that these digital phones will also be programmed to store the date/time in the phone when a particular data string is entered, so that when the SEND button is pressed, the stored date and time is sent along with the station and pod number. This, in turn, may be stored at the phone company for comparison with the program logs.

The problem of multiple advertisements broadcast in a closely spaced pod may alternatively be handled as follows: If, for example, four different ads were broadcast one after the other, the announcer would simply indicate "to respond to this ad enter *234 on your cell phone and press SEND now," if the particular ad was the fourth aired in the pod. In this instance it is important to distinguish whether the third digit being sent is to identify the pod number or the user's response. This can be handled in several ways: one way is to always announce a three digit ad identifier, even if the ad is the only one in the pod. Thus, the fourth digit and beyond will always be the user's response (in the example above, the user would key in *2342). Alternatively, the ad identifier digits could be separated from the user's response with a special symbol, such as *234*2, where 234 is the ad identifier and 2 is the user's response.

Once the phone company or other agency has received the information, the first two digits may be used to identify the relevant broadcast station, and in combination with the date, time and pod number, compared to the station log of that station to uniquely determine the information being responded to. The subsequent digits, if any, are the user's response which can be compared to the requested information, and a reply is generated. The reply can be communicated back to the user in print form on his/her cellular phone bill (a coupon, a winner notice, etc.). Alternatively, by registering a fax number, e-mail address or pager number, these and any other suitable means of communication back to the caller may be used.

If the reply to the user is provided in print form, the station log comparison and reply can be done "off-line" at a later time that the time of the call. If, however, it is desired to give the user a "real time" reply, a link will preferably be established between the phone company call log and the station program logs to enable an almost instantaneous comparison. The program log data would also preferably include suitable replies to the user's responses.

Once a comparison is made, a broadcaster/advertiser reply in the form of one of a series of pre-recorded messages may be transmitted back to the user's phone while the caller is still on the line (in this case, the confirmation beep tone to hang up would not be transmitted). For example, if the user guessed a contest question correctly, the message could say "you have won, and your prize is waiting for you at your local Sears store," or "sorry, your answer is incorrect," and so on, depending upon the outcome of the comparison of the user's response to the winning data stored in conjunction with the program log. In the event that the user has won a money prize, it could automatically credited on his cell phone bill (the phone company would recoup this amount plus a service charge from the advertiser/broadcaster).

Another embodiment to provide a real-time response is as follows. Assume that the ad is for show tickets, and that such an ad would conventionally include an 800 number to be called by the user to order the tickets. Very few listeners take the time to write down or memorize the phone number and make the call. In the PassKey embodiment, the reply information stored with the program log for this ad would include the 800 number. Once the comparison to the program log is made, the 800 number is retrieved, automatically dialed by the phone company, and connected to the user while the caller is still on the line. At this point, the user can carry on a live conversation with the advertiser.

Alternatively, in an off-line callback embodiment, since the phone company stores the originating phone number, the user can hang up, the comparison with the station log can be performed at a later time, and a call from the advertiser to the user can be made at a later time. A recorded announcement would preferably be made to the user during the originating call to alert the user to expect a callback. Only five key strokes (*2342) would be necessary to make this call, which is much more convenient and memorable than an 11-digit phone number. As users become familiar with the initial entry of the * symbol, only 4 numbers would need to be remembered.

In different embodiments, the number of keypad entries made by the user may be further reduced. If the telephone answering service includes voice response and recognition equipment, the user need only key in the station frequency. When a connection is made, a voice will request the user to either dial or SAY the user's response (and/or pod number) or any other information requested by the advertiser. Thus, the maximum keypad entries for any ad, including a pod number and a user response, would be five (*FREQ). By using voice recognition, a user response could be a word, such as YES or NO, as opposed to a number.

In yet another embodiment, the use of the * or # key can be eliminated. For example, assume that all responses are to be directed to a toll-free number such as 1-800-555-1234. Most cell phone include a store and recall function where the user can store frequently used numbers in various recall (RCL) positions (usually designated by a number from 1–99). If the user stores the toll-free number in position 3, when the user hears/sees an ad of interest, he or she simply enters RCL3 and SND. When connected, voice responses (and optionally voice recognition) software is used to prompt the user to enter or SAY the station frequency, pod number and/or response, Thus, in this embodiment, it is possible to reduce the keypad entries to just two (RCL(x)), whereby SDT# are all stored at the receiving location. Moreover, although this example uses a cell phone/car radio combination, it will be appreciated that the same system is equally applicable to a TV or radio broadcast in conjunction with a cordless/cord phone example for home use.

FIG. 1 illustrates a radio/cell phone example according to the invention. At 4:05 p.m., a radio broadcast 102 announces an opportunity to learn more about a particular advertiser ("West Coast Technical"), which is received by radio 104. As part of the broadcast, the announcer instructs listeners to press *94 on their cell phones to get more information. The program is broadcast on FM frequency 93.9 MHZ, as indicated by the display 106.

The user, being interested in this offer, enters *94 on their cell phone 110 and hits the SEND key. Note that, in this example, "94" happens to bear a convenient relationship to the frequency of the broadcast. As discussed elsewhere herein, this correlation is not required according to the invention, in that the station may be assigned a unique identifier unrelated to broadcast frequency, or the user may be instructed to enter one or more digits of the frequency on their own. The use of at least a portion of the channel frequency, or alphanumeric station ID (e.g., "K103"), is a convenient way to identify a particular broadcaster, however, since such information may either be known or easily derived by the caller.

In any case, the cell-phone call is used as a look-up in a database 120, typically under the control of the cellular telephone service provider. The call itself may be used to gather useful supplemental information about the call or caller, including, for example, geographical area (through area code or cell prefix), as well as the name, address, and other phone/fax numbers, e-mail address, and so forth. Such supplemental may have either been provided by the caller when signing up for the service, or the system may refer to other databases 123 which may include on-line directories to gather additional supplemental information.

In addition to the supplemental information being gathered about the caller, the "94" content of the transmission is used in conjunction with the date and/or time of day to determine the offer which the user is responding to. In this case, from database 124, it is determined that at 4:05, the station broadcasting on frequency 93.9 did, indeed, send out an offer regarding "West Coast Technical." Note that although databases 120 and 124 are shown as separate, they may co-located or distributed, with the any form of public or private communications network being used to integrate the data. Nor do the database look-ups need to be sequential, since the incoming call may trigger simultaneous inquiries to determine supplemental information about the call and the caller at the same time to avoid delays.

Having determined additional information about the caller and the nature of the broadcast, the system has what it need to formulate a reply 130 to the user/caller. As discussed elsewhere herein, this replay can come in various forms, which need not be mutually exclusive. In general, the reply is limited only to the extent of the information in the databases. That is, if the database 120 includes an address, the information can be mailed. If other phone or FAX numbers are present, they can be used as well. If an e-mail address is stored or entered by the caller, desired information may be downloaded to that address. If the advertiser includes a method of contact such as an 800 number 128, the user/caller may be patched into the advertiser as discussed elsewhere herein.

Given this wide range of responses, according to a best mode of carrying out the invention, it is expected that upon receipt of a call from a caller, the system will perform a search to determine whether that caller has previously registered a mailing address, FAX number, and so forth. Having determined this information, the system will preferably lead the caller through a series of automated options, perhaps using the caller's name in synthesized form, as follows:

"Hello June Williams. Thanks for your interest in West Coast Technical.

If you would like to receive further information by mail, press or say "1."

For further information by FAX, press or say "2."

To have the information sent to your e-mail address, press or say "3."

If you would like to have a West Coast Technical representative call you later at home, press or say "4."

If you would like to have a West Coast Technical representative call you later at work, press or say "5."

To speak directly with a West Coast Technical representative, just stay on the line."

Thus, in the above example, a search with respect to the caller would have determined that June Williams had provided a mailing address, a FAX number, an e-mail address, and home/work telephone numbers, such that all of the options would be appropriate. Also, in the case of an advertisement, the advertiser will preferably pay for the call from the caller (in addition to the ad), allowing the broadcaster to inform potential callers that their call will be free, thereby soliciting the largest audience. The ability to segregate incoming calls for such specialized payments may be accomplished through particularized encoding in an external or outlying billing system or revenue charging system 128 associated with call rating/billing. Note that as another advantage of the invention, due to the integration of caller background and demographic data, potential advertisers may be provided with access to customer credit history and other financial information, thereby gaining an insight into their level of qualification.

Note that the information need not be textual or graphical, but may also include audio and/or video information. For example, a radio station may provide a service whereby a caller may enter the station frequency (or other alpha/numeric identifiers) during a song, in which case the song will automatically be downloaded in digital form to the caller's e-mail address, enabling the caller to record the song on a digital music player of the type now offered by Rio Corp. Such a system according to the invention would not only be convenient, it would allow the agencies responsible for the collection of royalties to charge the caller for the download and distribute the payments as appropriate under copyright law, which is currently being circumvented in many cases.

In addition to broadcast ads, automobile occupants in particular are also subjected to a variety of other media such as outdoor billboards. Many of these list a phone number to contact the advertiser of other information provider. As with radio ads, however, this form of communication is not very effective, since the user is often not in a position to remember a long phone number or to write it down. The embodiments of the invention described below overcome this shortcoming by providing a simple and automatic way for a user to respond to non-broadcast advertising and other applicable media, and to receive a reply to that response.

Figure 2:
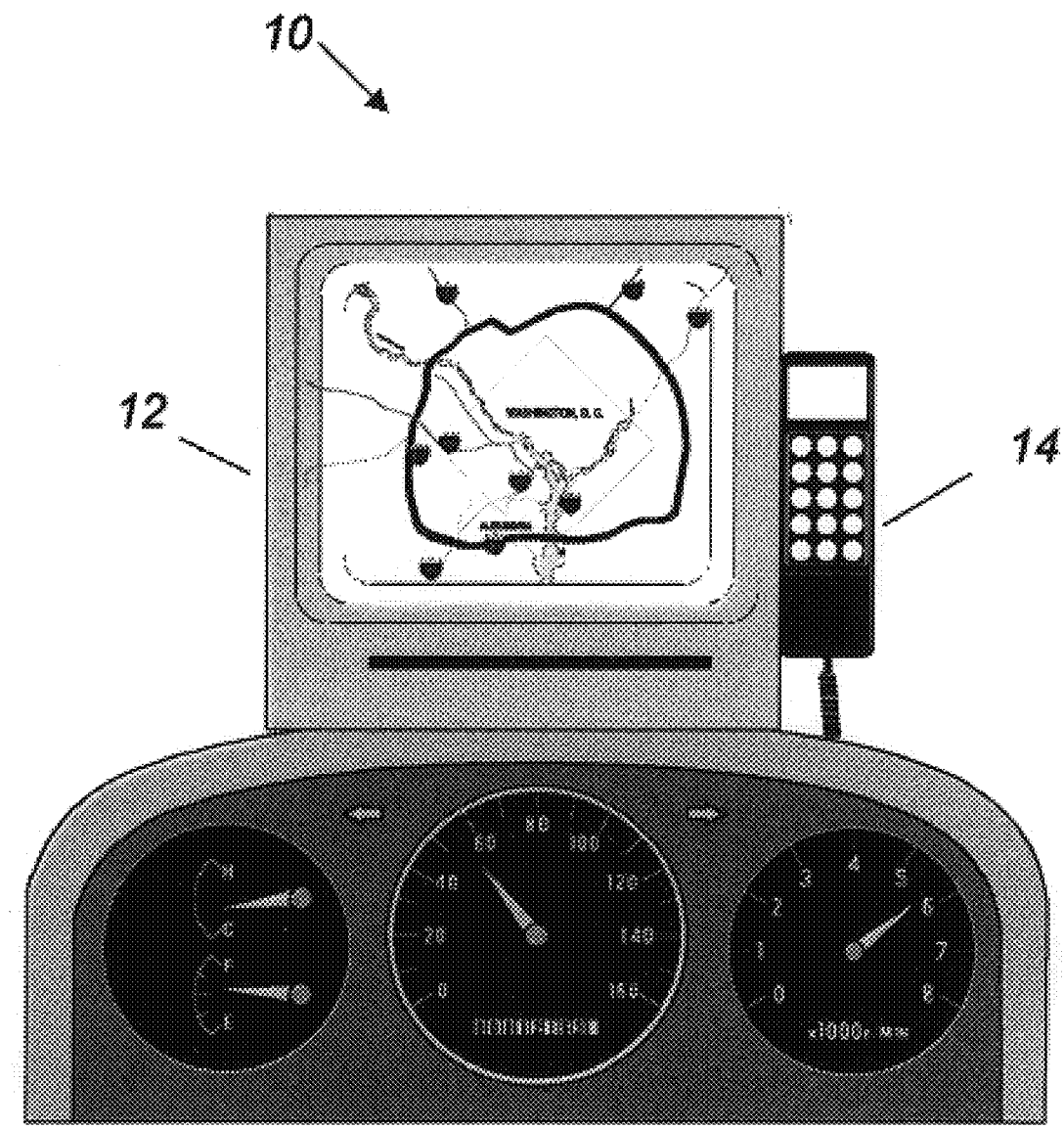
FIG. 2 is a drawing of a car dashboard which includes an integrated navigation and communication system applicable to certain embodiments of the invention.

Many new car models are being equipped with digital navigation systems based upon the global positioning satellite (GPS) system for position information. The navigation system is capable of identifying the car's location to within a few feet, and can also determine the direction of travel. Referring to FIG. 2, there is shown a car dashboard 10 which includes a navigation system and display 12 and a mobile cellular phone 14. It is envisioned that the phone 14 would be connected to communicate with the navigation system 12 whenever a particular key sequence is entered on the phone keypad. For example, the sequence #-3 could be used to enable this feature. Once this sequence is entered, the phone 14 receives from the system 12 information indicating the location of the car. The location might be in the form of latitude and longitude coordinates, as shown in the following table:

| Latitude | Longitude | Billboard ID# | Phone # | Reply |
|---|---|---|---|---|
| 37.845 N | 118.254 W | 2 | 1-213-555-6740 | Budget Auto Rental Auto Dial phone # and connect |
| 34.627 N | 76.923 W | 6 | 1-818-555-1273 | Danny's Restaurant 1 = brunch 2 = lunch 3 = dinner Send coupon with phone Bill |

Figure 3:
FIG. 3 depicts a billboard adapted for use with a GPS/mobile phone embodiment of the invention.
Figure 4:
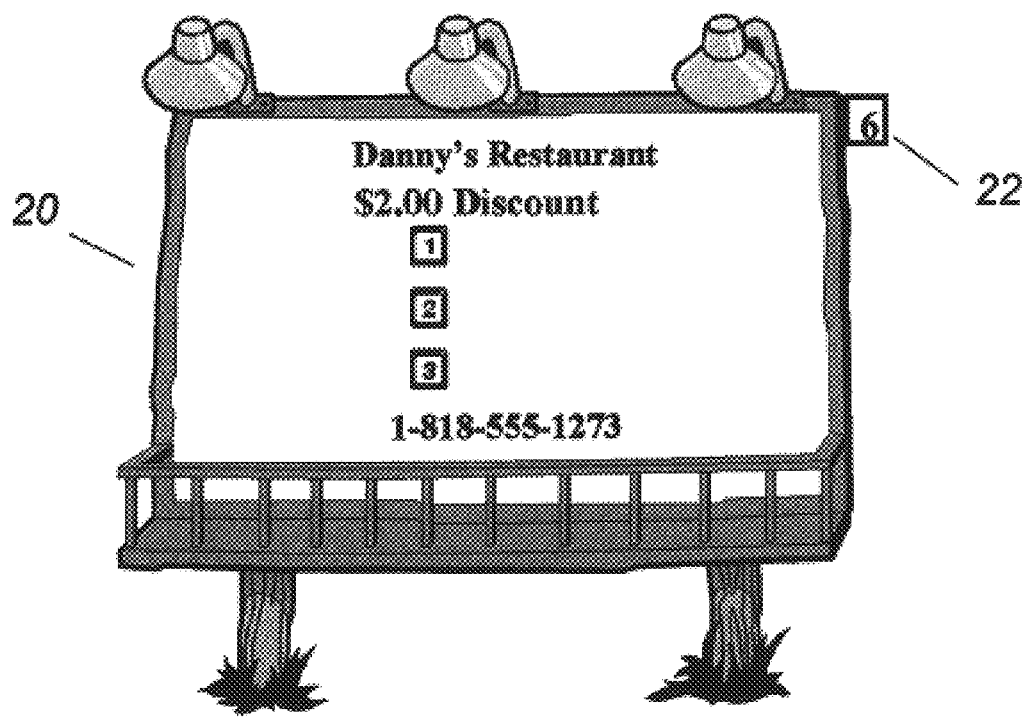
FIG. 4 is a drawing which shows how a user's response may be used to disseminate a customized reply.

Referring to FIG. 3, there is shown a billboard configured to be used with this embodiment of the invention. The billboard shows an ad for auto rental along with the conventional phone number. The billboard is also identified with a unique numerical identifier 18, which uniquely identifies this particular billboard from all other billboards at or proximate to this location, which might be an intersection. FIG. 4 shows yet another billboard which includes a coupon offer from a restaurant, and a numerical selection for breakfast, lunch or dinner. This billboard also include a unique identifier 22.

When a user drives by a billboard and wants to respond to the ad, the user simply enters the key sequence (#3) followed by the billboard identifier (2 in the case of FIG. 2). The user can also follow this with a numerical response, if prompted for one by the ad. For example, in FIG. 3, the user would just enter #32, and in the case of FIG. 4, might enter #362 to receive a lunch coupon. In each case, the key sequence is followed by the SEND key. When these key sequences are entered, the phone 14 receives the car location coordinates from the system 12, and transmits that along with the key sequence to the phone company. At a location accessible to the phone company, a billboard database is stored which contains the coordinates of the participating billboards, along with their ID numbers, and any reply information such as phone numbers, answers to questions, etc. Table 1 shows an example of such a database for the billboards of FIGS. 2 and 3.

The received data from the user is compared to the database to find the billboard in question using the coordinates and ID number, and the appropriate reply is communicated back to the user. In the case of FIG. 3, the phone company preferably autodials the auto rental phone number and connects the user directly to the advertiser. This may be in real time, or might be in the form of a call back, as described above. In the case of FIG. 4, the user's response (2) is noted and the user is preferably sent a lunch coupon from Danny's Restaurant in a subsequent cell-phone bill.

Due to errors in the navigation system and variations with respect to the time at which the user sends the information to the phone company, it is envisioned that a "guard band" of coordinates would be established for each billboard to ensure that it is correctly identified over a range of coordinates. The billboard ID numbers would be assigned to ensure that all billboards falling within that guard band could be uniquely identified.

Note that by using voice recognition software at the receiving end, the need for a GPS system can be eliminated. For example, using the RCL function described above, the user would dial the PassKey 800 number, and is asked to enter location and billboard number. For example, assume a Budget Auto Rental billboard number 2 was seen at the corner of Wilshire Boulevard and Rodeo Drive in Beverly Hills. In response to the question "Where are you?", the user would respond with that location, and in response to "What billboard are you interested in?" The user would respond with the billboard number. Alternatively, the user could also say the name of the billboard advertiser, such as Budget." In this embodiment, numbering of the billboards would not be necessary.

I claim:

1. A method of providing a reply to a telephone caller, comprising the steps of:
   receiving a communication from a telephone caller during or following a radio or television broadcast, wherein at least a portion of the communication relates to the broadcast;
   deriving supplemental information relating to the telephone caller or the telephone call;
   using the communication from the caller to identify the station responsible for the broadcast;
   using the station identification in combination with the supplemental information to formulate an appropriate reply; and
   providing the reply to the caller.

2. The method of claim 1, wherein the telephone call is a cellular telephone call.

3. The method of claim 1, wherein the communication includes an alphanumerical code entered by the caller.

4. The method of claim 1, wherein the communication is provided by the caller in response to a request.

5. The method of claim 1, wherein the communication relates to a channel number or broadcast frequency.

6. The method of claim 1, wherein the supplemental information includes the identity of the caller.

7. The method of claim 1, wherein the supplemental information includes at least a portion of the telephone number of the caller.

8. The method of claim 1, wherein the supplemental information includes the date or time of the communication.

9. The method of claim 8, wherein the current time forms a part of the communication.

10. The method of claim 1, wherein the step of providing the reply to the caller occurs during the telephone call.

11. The method of claim 1, further including the step of placing an additional telephone call to identify the appropriate reply.

12. The method of claim 11, wherein the caller is patched into the additional telephone call.

13. The method of claim 1, wherein the reply is sent through the mail, by facsimile, or via electronic mail later directed to the caller.

14. The method of claim 1, wherein the caller receives a bill, the method further including the step of adjusting the bill in response to the communication.

15. The method of claim 1, wherein the communication is received in response to an automated prompt supplied to the caller.

16. The method of claim 15, wherein:
   the communication is received in data form; and
   data recognition is used to interpret the communication.

17. The method of claim 16, wherein the telephone is a non-cellular phone.

18. The method of claim 1, wherein the reply includes digital audio or video information.

19. The method of claim 1, wherein:
   the communication from the telephone caller is entered in response to an advertisement; and
   the caller receives a credit toward a purchase as a result of the call.

20. Apparatus for providing a reply to a telephone caller in response to a telephone call received over a telephone network, comprising:
   a database storing information relating to a plurality of replies correlated to radio or television broadcasts; and
   programmed computer means including interfaces to the database and the telephone network, the programmed computer means being operative to perform the following functions:
   a) receive communication from the telephone caller, the communication including information identifying a radio or television broadcast,
   b) formulate an appropriate reply from the information stored in the database based upon the broadcast identified in the communication,
   c) derive supplemental information relating to at least one of the telephone caller and the telephone call, and
   d) provide the reply to the caller using the supplemental information.

21. The apparatus of claim 20, wherein the telephone network is a cellular telephone network.

22. The apparatus of claim 20, wherein the programmed computer means is operative to identify an appropriate reply in the database in accordance with a alphanumerical code entered by the caller.

23. The apparatus of claim 20, further including means for soliciting the communication from the caller.

24. The apparatus of claim 23, wherein the radio or television broadcast is used to solicit the communication from the caller.

25. The apparatus of claim 20, wherein the supplemental information includes the identity of the caller.

26. The apparatus of claim 20, wherein the supplemental information includes at least a portion of the telephone number of the caller.

27. The apparatus of claim 20, wherein the supplemental information includes the time or date of the communication.

28. The apparatus of claim 27, wherein the current time forms a part of the communication.

29. The apparatus of claim 20, wherein the response is provided during the telephone call.

30. The apparatus of claim 20, further including means for placing an additional telephone call to identify the appropriate reply.

31. The apparatus of claim 30, further including switching means for patching the caller into the additional telephone call.

32. The apparatus of claim 20, wherein the programmed computer is further interfaced to a facsmile or electronic mail to direct a reply to the caller.

33. The apparatus of claim 20, further including accounting means for adjusting a caller's bill in conjunction with providing a reply.

34. The apparatus of claim 20, further including an automated prompting capability to obtain at least a portion of the communication from the caller.

35. The apparatus of claim 20, wherein the supplemental information includes the caller's location.

36. The apparatus of claim 20, further including an automated prompting system for communicating with the caller.

37. The apparatus of claim 36, wherein the supplemental information is in the form of data responses from the caller, the apparatus further data recognition circuitry to interpret the responses.

38. The apparatus of claim 20, wherein the reply includes digital audio or video information.

39. The apparatus of claim 20, wherein the communication from the telephone caller is entered in response to an advertisement, the apparatus further including a database with billing information to ensure that the caller receives a credit toward a purchase as a result of the call.

40. The method of claim 1, wherein the reply includes at least a portion of the broadcast.

41. The apparatus of claim 20, wherein the reply includes at least a portion of the broadcast.

* * * * *